United States Patent
Tsujita et al.

(10) Patent No.: US 6,706,088 B2
(45) Date of Patent: Mar. 16, 2004

(54) METHOD FOR CONTROLLING MEMBRANE PERMEABILITY BY MICROWAVE AND METHOD FOR PRODUCING ORGANIC SEPARATION MEMBRANE

(75) Inventors: Yoshiharu Tsujita, Kasugai (JP); Hiroaki Yoshimizu, Chita (JP); Misao Miyamoto, Chiyoda-ku (JP)

(73) Assignee: Nissan Chemical Industries, Tokyo (JP)

( * ) Notice: Subject to any disclaimer, the term of this patent is extended or adjusted under 35 U.S.C. 154(b) by 0 days.

(21) Appl. No.: 10/304,639

(22) Filed: Nov. 27, 2002

(65) Prior Publication Data

US 2003/0075044 A1 Apr. 24, 2003

Related U.S. Application Data

(63) Continuation-in-part of application No. PCT/JP01/04449, filed on May 28, 2001.

(30) Foreign Application Priority Data

Jun. 2, 2000 (JP) .................................. 2000-165429

(51) Int. Cl.[7] .............................................. B01D 53/22
(52) U.S. Cl. ................................ 95/45; 96/4; 210/640
(58) Field of Search ................................ 95/45, 47–55; 96/4, 12–14; 55/524, DIG. 5; 210/640

(56) References Cited

U.S. PATENT DOCUMENTS

| | | | | |
|---|---|---|---|---|
| 4,952,220 A | * | 8/1990 | Langsam et al. ............... 96/13 |
| 4,976,897 A | * | 12/1990 | Callahan et al. ............. 264/425 |
| 5,409,524 A | * | 4/1995 | Jensvold et al. .................. 96/8 |
| 5,736,051 A | | 4/1998 | Degen et al. |
| 5,800,596 A | * | 9/1998 | Collin et al. ...................... 96/4 |
| 6,368,382 B1 | * | 4/2002 | Chiou ........................... 95/49 |

FOREIGN PATENT DOCUMENTS

| | | | |
|---|---|---|---|
| GB | 2244997 A | * | 12/1991 |
| JP | A 60-65107 | | 4/1985 |
| JP | A 60-99313 | | 6/1985 |
| JP | A 60-222196 | | 11/1985 |
| JP | A 62-201607 | | 9/1987 |
| JP | A 5-1166 | | 1/1993 |
| JP | A 5-146651 | | 6/1993 |

OTHER PUBLICATIONS

Yamauchi, Takeshi et al., "Electrically Controlled Protein Permeation through a Polyvinyl alcohol)/ Poly(acrylic acid) Composite Membrane." Polymer Gels and Networks 1.(1993). pp. 247–255.

* cited by examiner

*Primary Examiner*—Robert H. Spitzer
(74) *Attorney, Agent, or Firm*—Oliff & Berridge, PLC

(57) ABSTRACT

The present invention relates to a method for controlling a permeability of a gas to be separated through an organic separation membrane in a separation process of gasses by an organic separation membrane, wherein the method comprises irradiating the organic separation membrane with a microwave to cause vibration/rotation of a molecule or a domain thereof constituting the organic separation membrane and alter the molecular structure and/or polarity of the organic separation membrane, and thus altering a permeability of the gas to be separated; and also a method for producing an organic separation membrane, comprising irradiating with a microwave in a process of producing the organic separation membrane to alter the permeability thereof.

5 Claims, 1 Drawing Sheet

METHOD FOR CONTROLLING MEMBRANE PERMEABILITY BY MICROWAVE AND METHOD FOR PRODUCING ORGANIC SEPARATION MEMBRANE

This is a cont.-in-part of International application No. PCT/JP01/04449, filed on May 28, 2001.

BACKGROUND OF THE INVENTION

1. Field of the Art

The present invention relates to a method for controlling the permeability of a gas to be separated in a process of separating gasses by an organic separation membrane, characterized in that the method comprises irradiating the organic separation membrane with a microwave to alter the structure of the organic separation membrane; and a method for producing an organic separation membrane, characterized in that the method comprises irradiating the organic separation membrane with a microwave in a process of producing the organic separation membrane, thereby altering the structure of the organic separation membrane to control the permeability of a gas.

2. Description of the Related Art

Membrane separation processes which are currently known are used practically and applied utilizing several principles on membrane separation. The principles can be classified on the basis of driving forces and mechanisms of separation. The driving forces include static pressure difference, concentration difference, potential difference, partial pressure difference and the like, and the mechanisms of separation include sieving effect by pores, difference in adsorptivity, physicochemical exclusion of elute, difference in diffusion coefficients, difference in signs of ionic charges, difference in partition coefficient, difference in incorporation by supports, difference in releasing rates and the like.

In addition, kinds of separation membranes, structural control and producing methods have been devised depending on gasses to be separated in gas membrane separation process in order to exert the driving forces and mechanisms of separation at the maximum level. In these devices, the permeability of a gas through a separation membrane is altered by controlling the size, shape, distribution and density of pores on the separation membrane, the chemical structure, crystal structure and charge density of materials for the separation membrane by the use of several materials for membrane and producing methods. That is, methods for controlling permeability which are currently used are based mainly on the development of novel materials for membrane and the combination of the exiting techniques.

On the other hand, It is proposed that a membrane separation process based on a new concept which comprises controlling the permeability of a substance by controlling the opening and closing of molecular valve externally by electric stimulation. Such a membrane separation process includes, for example the one reported in Polymer Gels & Networks, Vol. 1, 247–255, 1993.

JP-A-63-201607 (1987) disclosed a method of regulating the permeability of the fluid permeable membrane for gas or liquid. In the method, the high frequency generator is connected to the membrane by clamps so that dielectric dispersion causes the membrane to be permeable to fluid.

However, at the present stage little is known about the development of membrane separation process based on a new concept other than the above mentioned one.

SUMMARY OF THE INVENTION

As a result that the present inventors researched eagerly, they found that irradiation to a separation membrane composed of an organic material with a microwave can alter the structure of a molecule or a domain thereof constituting the organic separation membrane externally to control the permeability of a gas to be separated (hereinafter, referred to as an external operation of molecular valve), and completed the present invention. For example, in a case of an organic separation membrane composed of cellulose acetate, when the organic separation membrane is irradiated with a microwave, an acetyl group that is a side group bonded to the cellulose skeleton starts to vibrate or rotate, or change the orientation thereof, thereby increasing or decreasing a part that a gas to be separated is permeable in the molecular structure, a so lied the size of molecular pores. And, the permeability of the gas to be separated is altered according to an increase or decrease in the size of the molecular pores.

Further, the present inventors found that the permeability of a gas through an organic separation membrane can be controlled by irradiating the organic separation membrane with a microwave in the production of the organic separation membrane.

Therefore, the present invention relates to the following aspects:

as first aspect, a method for controlling a permeability of a gas to be separated through an organic separation membrane in a separation process of gasses by an organic separation membrane, characterized in that the method comprises irradiating the organic separation membrane with a microwave to cause vibration/rotation of a molecule or a domain thereof constituting the organic separation membrane and alter the structure and/or polarity of the organic separation membrane, and thus altering a permeability of the gas to be separated;

as a second aspect, the method as set forth in the first aspect wherein the separation process is any one selected from a group consisting of gas permeation and pervaporation;

as a third aspect, the method as set forth in the first aspect, wherein the separation process is gas permeation;

as a fourth aspect, the method as set forth in the first aspect, wherein the organic separation membrane is any one selected from a group consisting of a densified membrane, a porous membrane, a complex membrane, a sintered polymer membrane, an oriented polymer membrane and an ion exchange membrane;

as a fifth aspect, a method for producing an organic separation membrane, characterized by irradiating with a microwave in a process of producing the organic separation membrane to control a permeability of the organic separation membrane;

as a sixth aspect, a method for producing an organic separation membrane, characterized in that the method comprises forming an organic separation membrane and then irradiating the resulting organic separation membrane with a microwave to control a permeability of the organic separation membrane;

as a seventh aspect, the method as set forth in the fifth aspect, wherein the organic separation membrane is any one selected from a group consisting of a densified membrane, a porous membrane, a complex membrane, a sintered polymer membrane, an oriented polymer membrane and an ion exchange membrane; and as an eighth aspect, the method as set forth in the sixth aspect, wherein the organic separation membrane is any one selected from a group consisting of a densified membrane, a porous membrane, a complex membrane, a wintered polymer membrane, an oriented polymer membrane and an ion exchange membrane.

The external operation of molecular valve by Irradiating with a microwave in the present invention has not known at all in the process of separating gasses, and this may be attributable to that it is difficult to design an apparatus therefor.

Further, conventionally, it has not been known 1) to irradiate with a microwave in a process of forming a membrane and control the structure itself of the membrane, 2) nor to control the structure of a membrane formed in advance by irradiating the structure of the membrane with a microwave.

DESCRIPTION OF THE PREFERRED EMBODIMENTS

Figure 1:
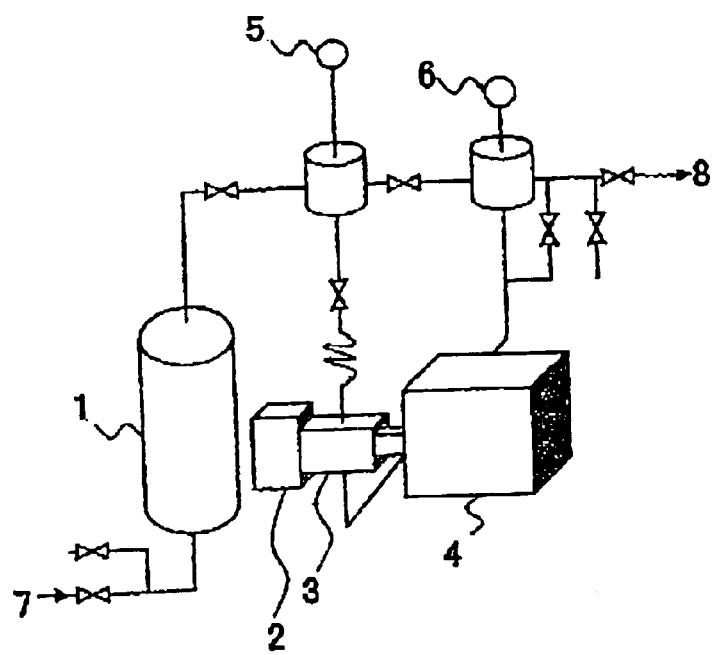
FIG. 1 is a schematic representation of a gas separation apparatus produced on the basis of a principle of the constant volume method in order to measure the permeability of a gas in a test method.

A so-called external operation of molecular valve which comprises controlling externally structural factors affecting the separation of a gas at a level of molecule or its domain by irradiating externally an organic separation membrane with a microwave, is based on a mechanism distinct from that of an external operation of molecular valve carried out by electric stimulation with an electrode or the like that contacts directly an organic separation membrane. In short, the invention has a non-contact (remote) external operation of molecular valve. The external operation of molecular valve with a microwave causes several vibrations/rotations of a molecule or a domain thereof constituting an organic separation membrane by irradiating the organic separation membrane with a microwave, and thereby altering the molecular structure and/or polarity of the organic separation membrane to change a permeability of the gas to be separated. It makes possible to separate gasses selectively and efficiently by accommodating well a combination of chemical or physical properties of the molecular valve itself and the microwave used.

The separation process used in the present invention includes, for example ones of transporting acceleratingly and releasing gradually, such as gas permeation or pervaporation. Preferable separation process is gas permeation.

Generally, when organic separation membranes are classified based on its pore size from the standpoint of passages in the membrane, they are classified into poreless densified membranes, porous membranes, fibrous membranes with large pores. When the membranes are classified based on its homogeneity, they are classified into homogeneous membranes, asymmetric membranes and complex membranes.

In the controlling method of the present invention, any membranes including a densified membrane, a porous membrane, a complex membrane, a sintered polymer membrane, an oriented polymer membrane, a synthesized polymer membrane and an ion exchange membrane can be used.

As a microwave in the controlling method of the present invention, the frequency band of the microwave is selected depending on an object to be processed. Though the frequencies of microwave may be optimized by the organic separation membrane and the gas, the frequencies of microwave that can be used are four frequencies that are allotted as industrial, Scientific and Medial frequency by Radio Law, that is, 915, 2450, 5800 and 22125 MHz. The frequency of 915 or 2450 MHz is generally used.

In the method for producing an organic separation membrane of the present invention, the structure of the membrane may be controlled by irradiating in a process forming a membrane with a microwave, or irradiating an organic separation membrane produced in advance with a microwave. The process conditions in the irradiation with the microwave may be appropriately changed depending on the output of the microwave used, the processing time thereby, the thickness of an object to be processed, molecular motional residues in the object to be processed that are induced with the microwave or the kinds and amount of components in the object, whether or not a hydrophilic compound that is added to the system processed with the microwave is present, or the like.

In the method for producing an organic 'separation membrane of the present invention, organic separation membranes are produced by using, for example, a phase separation method, a film-forming method on liquid surface, a vacuum deposition method, a bulk polymerization method, an interfacial polymerization method, a chemical reaction method or a mechanochemical method.

The microwave used in the method for producing and processing an organic separation membrane and the kinds of the organic separation membranes that can be produced are those described above on the controlling method of the present invention.

In addition, the irradiation with a microwave in the producing method of the present invention may be carried out by either oven system (microwave oven system or conveyer system) or waveguide system that can be selected according to shape of an object to be processed or amount to be processed, etc. The conveyer system is an equipment in which an object to be processed is put on a belt and continuously irradiated by passing it into a region irradiating with a microwave and is suitable for mass-production, and includes, for example, continuous microwave processing equipment produced by Micro Denshi Co., Ltd.

EXAMPLES

Hereinafter, the present invention is described more concretely on the basis of examples.

Test Method: Gas Separation Apparatus by Microwave Irradiation and Measurement of Gas Permeation (Constant Volume Method) Carried out by the Apparatus The measurements of gas permeation were carried out with an apparatus produced on the basis of the principle of the constant volume method. The outline of the apparatus is shown in FIG. 1. In the apparatus, a sample film was mounted in a cell portion 3 of a permeation apparatus provided with a dummy load 2, dried fully in vacuum while the whole of the system is kept vacuum, and the sample film in the cell portion 3 was irradiated with a microwave from a microwave producing portion 4. Then, a gas was introduced into a pressurizing tank 1 from a gab introducing inlet 7, and the system was pressurized with the pressurizing tank 1. After a steady state was reached, a gas pressure at the side of high pressure was detected with a pressure detector of high pressure side 5, a gas pressure at the side of low pressure having a connecting inlet 8 to a vacuum system was detected with a pressure detector of low pressure side 6, and an amount of permeated gas was calculated from the change in pressure. The average permeability coefficient was estimated from the inclination of the change in pressure utilizing equation (1) described below. The average permeability coefficient was indicated as an average of data determined five times. When a permeation measurement was determined at another temperature, the cell portion 3 was immersed into a water bath and the measurements were carried out after altering temperature with a Coolnics.

$$<P> = (273/T) \cdot (V/A) \cdot L \cdot (1/P) \cdot (1/76) \cdot (dp/dT) \quad (1)$$

<P>: Average permeability coefficient ($cm^3$*STP·cm/$cm^2$·second·cmHg)
T: Measurement temperature (K)
V: Volume at the low pressure side ($cm^3$)
A: Permeation measurement area ($cm^2$)
L: Thickness of film (cm)
p: Measurement pressure (cmHg)
dp/dT: Inclination of permeation curve at steady state (cmHg/second)

Example 1 and Comparative Example 1

A film was produced by casting 2.5 wt % solution of cellulose acetate (produced by Aldrich Chemical Company: Molecular weight 280,000, Acetyl content 39.8%) in chloroform on a glass dish and drying it at a room temperature for 24 hours. The film was annealed for 6 hours at 60° C. that was higher than the glass transition temperature of cellulose acetate, and cooled gradually to obtain an organic separation membrane.

On the resulting cellulose acetate membrane, the permeation test of carbon dioxide was carried out at 25° C. under 1 atm as mentioned above and its average permeability coefficient was determined.

First of all, the permeation test was carried out without irradiating the organic separation membrane with a microwave. The average permeability coefficient was consequently $5.6 \times 10^{-10}$ (SD value: $0.66 \times 10^{-10}$ (Comparative Example 1).

Next, 10 minutes later of the permeation test, another permeation test was carried out under the same condition with irradiating the film with 200 W microwave of 2450 MHz. The average permeability coefficient was consequently changed to $7.1 \times 10^{-10}$ (SD value: $0.54 \times 10^{-10}$ (Example 1).

Further, 10 minutes later, the irradiation of the microwave was stopped and the permeability coefficient was measured. The resulting permeability coefficient was the same as the value before the irradiation of the microwave Example 2 and Comparative Example 2

A film was produced by casting 2.5 wt % solution of cellulose acetate (produced by Aldrich Chemical Company: Molecular weight 280,000, Acetyl content 39.8%) in chloroform on a glass dish and drying it at a room temperature for 24 hours to obtain an organic separation membrane.

The resulting cellulose acetate membrane was irradiated with 200 W microwave for 20 seconds, then the permeation test was carried out without irradiation of microwave of 2450 MHz. The average permeability coefficient was consequently $5.1 \times 10^{-10}$ (SD value $1.14 \times 10^{-10}$) (Example 2).

On the other hand, the permeation test was carried out similarly as Example 2 on the cellulose acetate membrane that was not irradiated with a microwave. The average permeability coefficient was consequently $5.7 \times 10^{-10}$ (SD value $0.44 \times 10^{-10}$) (Comparative Example 2).

Example 3 and Comparative Example 3

A chitosan acetate salt film was produced by casting 2 wt % aqueous solution of chitosan (chitosan DAC-100 (sample name): Molecular weight 500,000, Degree of Deacetylation 100%) in 1 M acetic acid on a siliconized glass dish and drying it at 60° C. for 6 hours. The film was immersed in 1 M aqueous solution of sodium hydroxide for 24 hours, carefully washed in a water bath, further immersed three times in distilled water, and sufficiently dried to obtain a chitosan film as an organic separation membrane.

On the resulting chitosan membrane, the permeation test of oxygen was carried out at 25° C. under 1 atm as mentioned above and its average permeability coefficient was determined.

First of all, the permeation test was carried out without irradiating the organic separation membrane with a microwave. The average permeability coefficient was consequently $1.82 \times 10^{-13}$ (Comparative Example 3).

Next, 30 minutes later of the permeation test, another permeation test was carried out under the same condition with irradiating the film with 500 W microwave of 2450 MHz. The average permeability coefficient was consequently changed to $1.23 \times 10^{-11}$ (Example 3).

Further, the irradiation of the microwave was kept for 3 hours and the permeability coefficient was measured. The resulting average permeability coefficient was $4.71 \times 10^{-11}$. The good permeability of oxygen was kept with irradiating.

According to the present invention, the structural factors affecting the separation of a gas at a level of molecule or its domain can be controlled externally by irradiating an organic separation membrane with a microwave, that is, a so-called external operation of molecular valve can be achieved. Further, a modification suitable for a combination of chemical or physical properties of the molecular valve itself and the microwave used makes possible to construct a gas membrane separation process more excellent in efficiency and selectivity.

What is claimed is:

1. A method for controlling a permeability of a gas to be separated through an organic separation membrane in a separation process of gasses by the organic separation membrane, characterized in that the method comprises irradiating the organic separation membrane with a microwave to cause vibration/rotation of a molecule or a domain thereof constituting the organic separation membrane and alter the molecular structure and/or polarity of the organic separation membrane, and thus altering a permeability of the gas to be separated.

2. The method according to claim 1, wherein the separation process is any one selected from a group consisting of gas permeation and pervaporation.

3. The method according to claim 1, wherein the separation process is gas permeation.

4. The method according to claim 1, wherein the organic separation membrane is any one selected from a group consisting of a densified membrane, a porous membrane, a complex membrane, a sintered polymer membrane, an oriented polymer membrane and an ion exchange membrane.

5. The method according to claim 1, wherein the organic separation membrane is a cellulose acetate membrane or a chitosan membrane.

* * * * *